United States Patent [19]

Foster

[11] 4,037,877
[45] July 26, 1977

[54] DOWN-LOADING DEVICE

[76] Inventor: Allen Foster, c/o Clark Associates, Bldg. 10, S. Tenth & Wright Ave., Richmond, Calif. 94804

[21] Appl. No.: 660,635

[22] Filed: Feb. 23, 1976

Related U.S. Application Data

[62] Division of Ser. No. 550,443, Feb. 18, 1975, Pat. No. 3,942,840.

[51] Int. Cl.² .............................................. B65G 53/36
[52] U.S. Cl. ......................................... 302/53; 302/57
[58] Field of Search ........................ 302/40, 45, 48, 49, 302/51-57; 259/1 R, 4 R, 36, DIG. 17; 222/194

[56] References Cited

U.S. PATENT DOCUMENTS

| | | | |
|---|---|---|---|
| 1,616,547 | 2/1927 | Pontoppidan | 302/53 |
| 2,602,707 | 7/1952 | Garoutte | 302/53 |
| 2,915,337 | 12/1959 | Loomis | 302/53 |
| 2,919,159 | 12/1959 | Lacroix | 302/53 |
| 3,933,394 | 1/1976 | Klein et al. | 302/57 |

Primary Examiner—Evon C. Blunk
Assistant Examiner—Jeffrey V. Nase
Attorney, Agent, or Firm—Warren, Chickering & Grunewald

[57] ABSTRACT

There is disclosed a device for loading down which includes a source of air-fluffed down and a blower for delivering down entrained in air through at least one down-loading station. The device includes connections to draw down from its source to a calibrated filter and to reverse the flow through the filter when a predetermined amount of down has been delivered, whereby the down is removed from the filter and delivered, entrained in air, to a loading station. There is also disclosed a two-vessel device for providing a small amount of air-fluffed down from a large, compact capacity.

1 Claim, 3 Drawing Figures

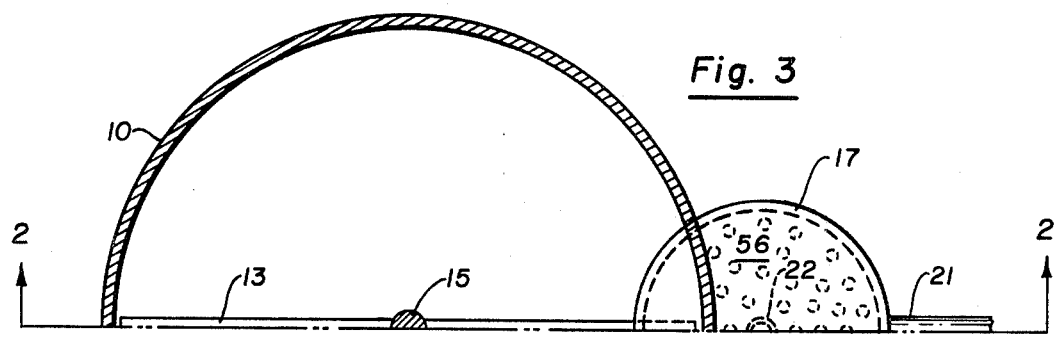
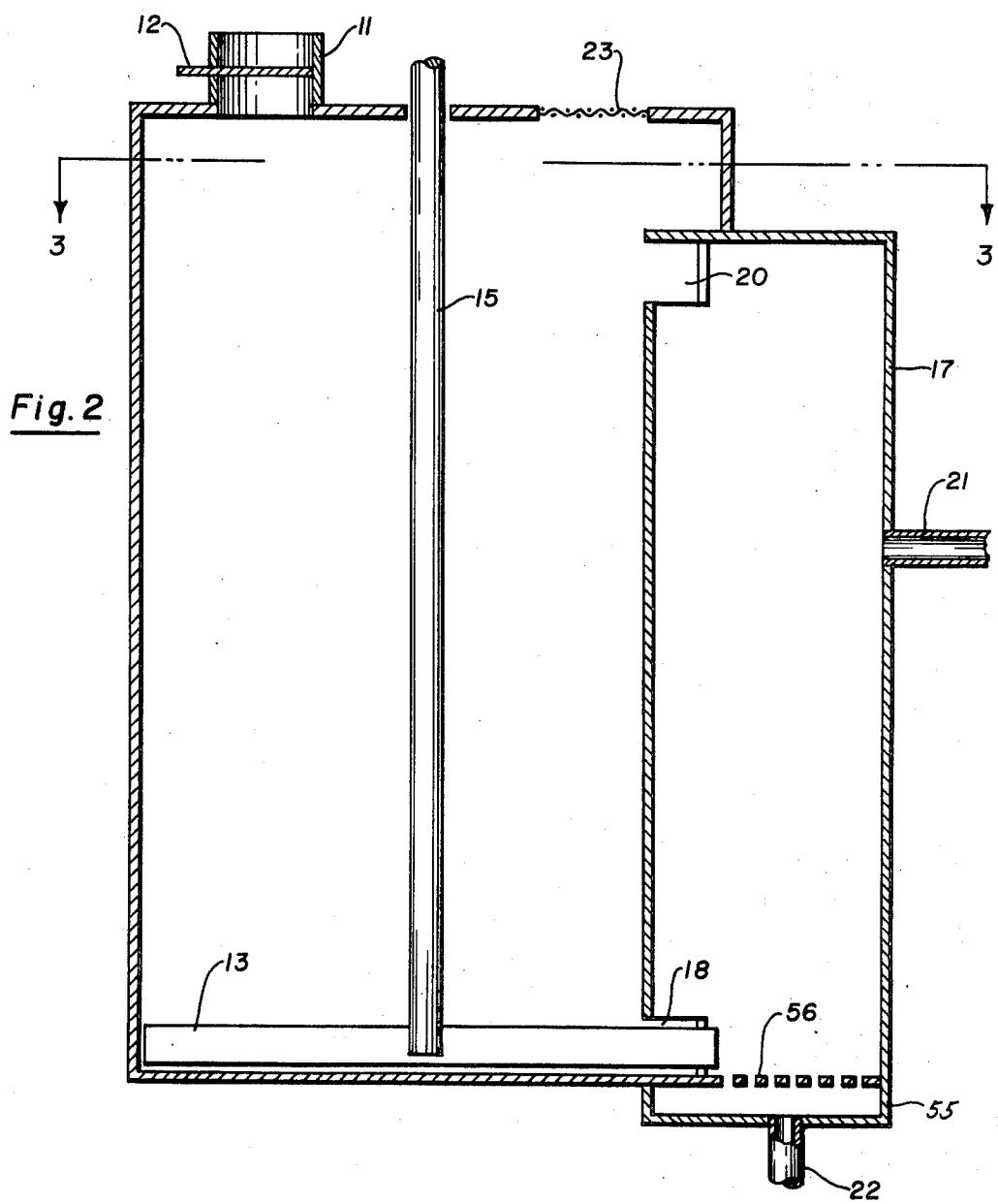

DOWN-LOADING DEVICE

This is a division of application Ser. No. 550,443, filed Feb. 18, 1975, now U.S. Pat. No. 3,942,840.

BACKGROUND OF THE INVENTION

It is well known that down has exceptional insulating value per unit of weight. However, for the insulating value of down to be obtained, it must be carefully loaded into sleeping bags, quilts, jackets or other articles employed to maintain a person warm. The high loft of down is largely responsible for its insulating value. However, if too much down is loaded into an article or if too little down is loaded into an article, the maximum benefit of the insulating value of the down is not obtained.

Down-filled articles are usually made as a series of tubes so that the migration of down is limited when the article is in use. The tubes are arranged in overlapped arrays or in other arrays so that the seams between adjacent tubes will be covered, on one side or the other, with a volume of down. The widely known fluffy and light character of down makes it very difficult to load properly. Ordinarily filling articles with down is accomplished in a "down room" because the light and fluffy character of the down makes its escape inevitable, messy and wasteful; and down rooms are employed because they tend to restict the loss of down to a limited area. However, the fact that loading down is a messy job is the least of the problems because the escape of down is simply characteristic of the difficulties involved with measuring it, and after measurement loading it into an article. Down is usually measured by weight, and it is important not only that a down-filled article contain the proper weight of down but additionally that each of the tubes from which the article is made contain the proper weight of down. It is evident that weighing a quantity of down is difficult because such small amounts occupy so much volume. It is also evident that once a weighed quantity of down is obtained, loading that weighed quantity into a fabric tube without loss is also difficult.

Down loading is conventionally accomplished by entraining a measured quantity of down in air, then passing the air with the down entrained through a nozzle that is inserted in a tube to be filled with down. The tubes are generally made of tightly woven fabric which makes them ideal for filtering the down from the air, resulting in a down-filled tube. Although down losses in the filling of the tube are greatly minimized by employing this technique, there is still a great deal of difficulty in measuring down and introducing it into an entraining air stream so that it may be delivered to a loading nozzle.

THE INVENTION

The present invention includes a device which provides a means for accurately measuring down and for delivering the down to the article that will contain it in accurately measured increments, entrained in air, and without loss. Down rooms employing the device of this invention are substantially free from down accumulations in the air, on the floor, or other horizontal surfaces.

The device includes a source of air-fluffed down, a blower, a filter calibrated to measure a predetermined amount of down, and a number of valves and conduits. The various elements are connected so that the suction side of the blower connects to the source of air-fluffed down in a manner to draw the air through the filter where down accumulates on the filter as the air passes through.

When the predetermined amount of down is collected on the filter, a number of valves move between open and closed positions whereby air is drawn through the filter in reverse direction so that the known quantity of down on the filter becomes entrained in that air and delivered to a downloading station. As stated above, the down-loading station is usually equipped with a metal nozzle that can be inserted into the tubes of a down-filled article so that the fabric of the article acts as a filter to remove down while passing the air through the fabric.

The invention also includes means for providing a long-lasting or continuous, dependable source of air-fluffed down. Air-fluffed down is necessary for down loaders including down entrained in air. However, even compact down has so much loft that it occupies a great deal of volume per unit of weight. Air-fluffed down occupies substantially more volume. It has been found that down-loading equipment employing down entrained in air must be shut down frequently to reload the air-fluffing element of the device because the down supply is quickly exhausted in that even very large volume air fluffers can contain very small weights of down. In accordance with one aspect of this invention, a large capacity of compact down is maintained in communication with a small capacity of air-fluffed down. The invention includes a first large vessel containing the compact down, a second small vessel with a source of air in the bottom wherein a passageway between the bottom of the first vessel and the bottom of the second vessel is provided with a means for forcing down from the first vessel to the second vessel. A passageway between the top of the first vessel and the top of the second vessel provides a means for passing air from the second vessel to the first vessel. The second vessel is also provided with an intermediate outlet for air-fluffed down to be delivered to the measuring, transporting, and loading device of the invention. The first vessel has a filter in the top thereof and an access port for loading down.

DETAILED DESCRIPTION OF THE INVENTION

This invention can be best described with reference to the accompanying drawings.

FIG. 2 is an elevation, sectional view of a device for providing air-fluffed down.

FIG. 3 is a sectional view taken along the line 3—3 of FIG. 2 illustrating the device of FIG. 2. FIG. 3 is symmetrical about its centerline, and accordingly only half of the cross section is shown.

Figure 1:
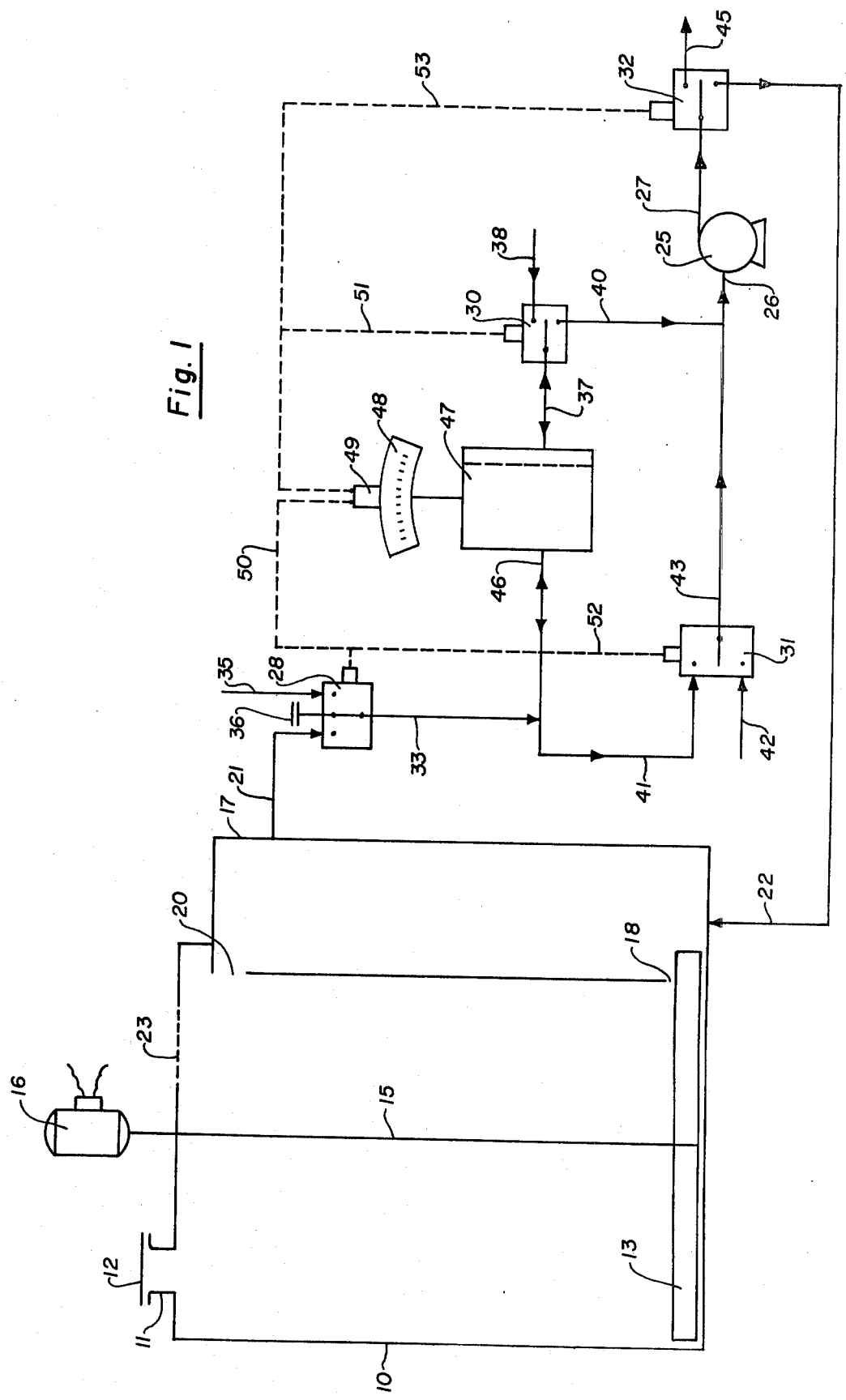
FIG. 1 is a schematic flow diagram of a system embodying this invention.

The large vessel 10 is a source of compact down for the present invention. A loading port 11 with a suitable cover 12 is provided to introduce down from any suitable container into the vessel 10. In the vessel 10 the down packs down to the natural compactness caused by gravity. The vessel 10 is provided, in the embodiment illustrated, with an impeller 13 driven by a shaft 15 which in turn is driven by an electric motor 16. The down-fluffing device is in the form of a large cylinder 10 intersected by a smaller cylinder 17.

The smaller cylinder 17 has a down inlet 18 at the bottom thereof and an air outlet 20 at the top thereof. The cylinder 17 also has an intermediate outlet 21. Hereinafter the cylinder 10 shall be referred to as the first vessel, and the cylinder 17 shall be referred to as the second vessel.

The line 22 provides a source of air into the lower portion of the second vessel 17. The air entering through line 22 passes upwardly through the second vessel 17 and discharges through the upper passageway 20 into the upper portion of first vessel 10. The air passes through a filter 23 maintained in the top of vessel 10 which permits air to pass out of first vessel 10, but removes down from that air so that it falls into first vessel 10 and joins the capacity of down maintained therein.

The heart of the down-delivery system is the blower 25 which has a suction line 26 and a discharge line 27. The system also includes a valve 28, which is movable among three positions, and valves 30, 31 and 32, which are movable between two positions. The positions that valve 28 can move among are a position connecting line 21 with line 33 discharging from the valve 28, a position connecting line 35 with line 33, and a position sealing off the inlet to line 33 which is indicated by a plugged line 36.

Valve 30 alternatively connects line 37 either with line 38, which is open to the atmosphere, or with line 40, which connects to line 26, the suction of the blower 25. Valve 31 alternatively connects line 41 or line 42 with line 43 which also is connected with the suction line 26 of the blower 25. Valve 32 alternatively connects line 27 with line 22 entering the bottom of the second vessel 17 or with line 45 that connects to a discharge nozzle that is used to fill down into a down-filled article. Line 33 also is connected to line 46 which enters the filter 47. The filter 47 is connected to scale 48 which is illustrated schematically as including means illustrated by line 50, 51, 52 and 53 for automatically changing the positions of the valves 28, 30, 31 and 32.

The operation of the device is as follows. The loading cycle is begun by moving valve 28 to connect line 21 with line 33, moving valve 30 to connect line 37 with line 40, moving valve 32 to connect line 27 with line 22, and moving valve 31 to connect line 43 with line 42. With the valves in this position, down entrained in air is drawn from second vessel 17 through line 21 and line 33, after which it passes through line 46 and into the filter 47. In the filter 47 down is removed from the air stream, and the air passes through line 37 and line 40 into the suction side of the blower 25. The blower 25 moves the air through line 27 and line 22, returning it to the second vessel 17 to provide the air necessary for fluffing the down. As this flow continues, down accumulates in filter 47, and scale 48 senses the amount of down that is accumulating. When a predetermined amount of down accumulates, the control device associated with the filter 48 actuates the various valves as follows. Valve 28 is actuated to be connected to plug 36. In a preferred embodiment, valve 28 momentarily is connected to line 35 so that any down accumulated in the lines 33 and 46 are carried into the filter 47 so that it, too, may be weighed. Preferably, the control device 49 actuates the movements of the valve 28 slightly before the desired amount of down is in the filter 47. After momentarily connecting line 33 to line 35, the down is weighed again; and if insufficient down is then in the filter, valve 28 momentarily connects line 33 to line 31 again so that a small increment of down may be added to the filter 47. When sufficient down is in filter 47, control device 49 actuates valve 28 so that line 33 is plugged, actuates valve 30 so that line 37 is connected to line 38 which opens to the atmosphere, actuates valve 31 so that line 41 is connected to line 43, and actuates valve 32 so that line 27 is connected to line 45. In this position, air enters the system through line 38, passes through line 37, and enters filter 47 flowing in the reverse direction from the original flow through filter 47, whereby the down accumulated on the filter 47 is removed. The down, now entrained in air, is passed through line 46, line 41 and line 43 into the suction side of blower 25 at line 26. The entrained air then passes through the blower 25 through line 27 and is delivered to a down-filling station via line 45.

The duration of this portion of the cycle may be timed or it may be controlled by a combination of weight and time: for example, when the control mechanism 49 senses that the weight of the filter 47 is the tare weight, several seconds elapse before the valves are returned to the positions described at the beginning of the cycle. It has been found that the cycle required to load one tube of a down-filled article, i.e. the duration of time required for both of the cycles described above, is less than five seconds.

It is preferred that the total cycle be triggered by an operator at the down-loading station at the end of line 45, whereby the cycle will begin when a nozzle is inserted into a fabric tube to receive down and it will be terminated by the operator actuating a mechanism that triggers the beginning of the next cycle.

Down is normally measured by weight. The scale 48 is preferably a load cell that employs strain gauges that can be preset for any desired weight. Such a load cell has been found to measure the weight of down within 1/200 of an ounce.

Many variations of the present invention may be effected within its broad scope. It is within the scope of this invention to provide a separate blower for line 22 so that the fluffed down in second vessel 17 is maintained fluffed at all times and at a uniform rate. The down may be measured within filter 47 volumetrically in that a given volume of down delivered to the filter 47 at a given flow rate is substantially equivalent to a weight measurement.

FIGS. 2 and 3 describe in more detail the device employed in this invention to maintain a supply of fluffed down. The first vessel 10 is shown as a cylindrical vessel having a large capacity compared to the capacity of the second vessel 17. The first vessel 10 is provided with a shaft 15 that drives an impeller 13. The first vessel 10 also is provided with a filter 23 and a closable loading port 13 which is shown herein as being maintained closed with a damper-like element 12. This manner of maintaining port 11 closed is preferred so that down may be added to first vessel 10 without shutting down the process whereby substantially an infinite capacity of down is available to the system. The down in vessel 10 is compact as contrasted to air-fluffed in that it simply lies in the first vessel 10. As the impeller 13 rotates, on each revolution it pushes two small increments of down into the second vessel 17 through the lower opening 18. The down in the second vessel 17 is fluffed by air entering line 22 and, in a preferred embodiment, passing through housing 55 and through sparger 56 so that it is distributed uniformly across the bottom of the second vessel 17. As a result, the down is maintained as a very light dispersion of down in air with each feather separated from each other feather and without clumps that would tend to jam into valves or blowers.

Excessive amounts of down in the second vessel 17 simply pass through the upper opening 20 wherein they are returned to the first vessel 10. The air passes through the upper passageway 20, exits through the filter 23 maintained in the top of the first vessel 10; while the down entrained in that air either falls into the main capacity of down in the first vessel 10 as it passes through the passageway 20 or is removed through the filter 23.

Filter 23 will be of adequate size to remove down without causing large accumulations of it; and in a preferred embodiment, several filters 23 may be employed so that some may be cleaned by reverse blasts of air while others are employed in removing down from the air escaping through them.

The air-down mixture removed through line 21 is a very light dispersion that is ideally suited for delivery through the various valves and conduits of the system described with reference to FIG. 1.

The elements of the device illustrated in FIGS. 2 and 3 may be substituted with equivalent elements if desired. Thus, instead of an impeller 13, other suitable and equivalent means for forcing compact down from the first vessel 10 through the passageway 18 and into the second vessel 17 may be employed. These means may include such devices as a plunger, a continuous conveyor belt, or even a blast of air directed through the passageway 18 by a nozzle.

The manner of introducing air into the lower portion of second vessel 17 may be varied to obtain a dispersion of the characteristics desired. Although the vessels are illustrated as intersecting cylinders, they may be in any shape desired and may be separate from each other and provided with conduit-type passageways to provide the communication illustrated with openings 18 and 20. Also, the size and positional relationships with regard to elevation may be varied without departing from the concept of this invention.

What is claimed is:
1. A device for producing air-fluffed down comprising a first vessel and a second vessel with,
A. said first vessel having an upper opening to admit down, an upper filter to separate entrained down from air, an upper passageway into said second vessel, a lower passageway into said second vessel, and means to force down through said lower passageway and into said second vessel,
B. said second vessel having a lower air inlet, a lower opening connected to the lower passageway of said first vessel, an intermediate down-air outlet, an upper air outlet connected to the upper passageway in said first vessel, whereby said first vessel may contain a capacity of compact down and said second vessel may contain a predetermined amount of air-fluffed down,
C. said second vessel being cylindrical and of smaller diameter than said first vessel, and with said first and second vessels positioned so that the circular wall of said second vessel is partly within said first vessel.

* * * * *